United States Patent [19]
Kobayashi

[11] Patent Number: 5,402,420
[45] Date of Patent: Mar. 28, 1995

[54] COMMUNICATION UNIT HAVING NON-DESTRUCTIVE ARBITRATION FUNCTION

[75] Inventor: Masayuki Kobayashi, Anjo, Japan

[73] Assignee: Nippondenso Co., Ltd., Kariya, Japan

[21] Appl. No.: 928,342

[22] Filed: Aug. 12, 1992

[30] Foreign Application Priority Data

Aug. 12, 1991 [JP] Japan .................. 3-201977
Jul. 30, 1992 [JP] Japan .................. 4-203530

[51] Int. Cl.6 ............. H04L 12/40; H04L 12/28
[52] U.S. Cl. ................. 370/85.2; 370/85.3; 370/9; 340/825.5
[58] Field of Search ........ 370/85.1, 85.2, 85.3, 370/94.1, 85.9, 8, 9; 340/825.5, 825.51; 375/22; 371/67.1, 34, 6, 68.2

[56] References Cited

U.S. PATENT DOCUMENTS

| | | | |
|---|---|---|---|
| 4,596,011 | 6/1986 | Kobayashi et al. | 370/85.9 |
| 4,706,082 | 11/1987 | Miesterfeld et al. | 370/85.2 |
| 4,739,323 | 4/1988 | Miesterfeld et al. | 370/85.2 |
| 4,745,596 | 5/1988 | Sato | 370/85.2 |
| 4,807,231 | 2/1989 | Sato | 371/55 |
| 4,888,763 | 12/1989 | Hatfield et al. | 370/85.2 |
| 4,980,884 | 12/1990 | Chang | 370/9 |
| 5,086,427 | 2/1992 | Whittaker et al. | 370/85.1 |
| 5,119,371 | 6/1992 | Inoue et al. | 370/85.1 |

FOREIGN PATENT DOCUMENTS 2116235 4/1990 Japan .
2250449 10/1990 Japan .

OTHER PUBLICATIONS

SAE Recommended Practice J1850, Class B Data Communication Network Interface [Aug. 1991].
82526 Controller Area Newtwork Chip Architectural Overview, Intell Corporation, 1988.

Primary Examiner—Wellington Chin
Assistant Examiner—Chau T. Nguyen
Attorney, Agent, or Firm—Cushman, Darby & Cushman

[57] ABSTRACT

A communication unit in a CSMA/CD data communication system having a non-destructive arbitration function which allows to prevent communication failure due to receiving delay of transmission data or difference of system clocks among communication units by providing in a transmission line transmitting section 14 a counter 32 which is reset by leading edge of the transmission data on a transmission line inputted from a receiving terminal RX through the intermediary of a synchronization comparator 38 and by determining leading and trailing timings of the transmission data per one bit from a count value thereof and reference values defined in leading edge comparator 34 and trailing edge comparator 36.

12 Claims, 9 Drawing Sheets

COMMUNICATION UNIT HAVING NON-DESTRUCTIVE ARBITRATION FUNCTION

BACKGROUND OF THE INVENTION

1. Field of the Invention

The present invention relates to a communication unit having a non-destruction arbitration function for use in a data communication system implementing a CSMA/CD (carrier sense multiple access/collision detection) method for conducting serial communication by implementing pulse-width modulation or a similar technique on digital data.

2. Description of the Related Art

In the past, a CSIA/CD data communication system having a non-destructive arbitration function has been known. This system has the following functions: (1) starting transmission of transmission data when no transmission data from another communication unit is present on a transmission line, (2) monitoring collision of the transmission data being transmitted with transmission data from other communication units on the transmission line during transmission of the transmission data, (3) causing the communication unit transmitting the transmission data having higher priority to continue to transmit the transmission data when the transmission data collide and (4) causing the communication unit transmitting the transmission data having lower priority to halt the transmission of the transmission data. This kind of system is described in U.S. Pat. No. 4,745,596. Also, the J1850 Standard, which is an international standard is defined according to this system.

This communication unit confirms whether the transmission data which it outputted is flowing on the transmission line per one bit of the transmission data and if the same data with the transmission data which it has transmitted is flowing on the transmission data, it continues to transmit the transmission data. If the same data with the transmission data which it transmitted is not flowing on the transmission line, it stops transmitting the transmission data.

Accordingly, when each communication unit composing a data communication system operates as described above and when three communication units A, B and C as shown, for example, in FIG. 12, start to transmit transmission data simultaneously at time t1, each of the communication units continues to transmit the transmission data when the transmission data from each of the communication units A, B and C agree and the same transmission data with the transmission data which are transmitted from each of the communication units A, B and C is flowing on the transmission line L. Then, when the transmission data from each of the communication units A, B and C begin to disagree and when transmission data having higher priority among them (higher level has a priority in FIG. 12) starts to flow on the transmission line L, the communication units B and A which have transmitted transmission data having less priority halt transmitting the transmission data one by one and in the end, only the communication unit C continues to transmit the transmission data.

In the CSMA/CD data communication system having such a non-destructive arbitration function, the transmission data may be outputted at any time when another communication unit is not outputting transmission data on the transmission line. However, since the communication unit transmits/receives transmission data through the intermediary of a known transmission line driver/receiver (hereinafter referred to simply as a D/R), a delay time is generated when the communication unit receives the transmission data on the transmission line due to the transmission delay of the D/R or the floating capacity of the transmission line.

Due to this fact, as shown in FIG. 13 for example, even if one communication unit starts transmission of transmission data from a transmission terminal TX1, the communication unit and other communication units receive the transmission data with a delay of delay time $\Delta d$ (TX1' shown in the Figure) and another communication unit may start transmitting transmission data from a transmission terminal TX2 during that delay time $\Delta d$. In this case, since each of the communication units receives the transmission data from the transmission terminal TX2 in a delay of the delay time $\Delta d$ (TX2' shown in the Figure), a signal in which the transmission data TX1' and TX2' from each of the communication units are combined is inputted to receiving terminals RX1 and RX2 of each of the communication units in the end. The input data has become data which is different from the transmission data transmitted by each of the communication units (data whose shaded portion has been changed from Low level to High level), and normal data communication may not be executed.

On the other hand, in this type of data communication system, since each communication unit operates in accordance with own the system clocks, system clock may differ between each communication unit and periods of transmission data to be transmitted may not agree. In this case, as shown in FIG. 14 for example, even if two communication units start transmitting transmission data from transmission terminals TX1 and TX2 with the same timing, a signal which is different from the transmission data transmitted by each of the communication units appears on the transmission line L due to the deviation of the periods of each transmission data and each of the communication units may end up halting the transmission of the transmission data altogether.

SUMMARY OF THE INVENTION

Accordingly, it is an primary object of the invention to provide a communication unit for a CSMA/CD data communication system having a non-destructive arbitration function which allows a system to execute normal data communications even if there is a delay in receiving transmission data between each of the communication units or if there is a difference between system clocks of each of the communication units.

In order to achieve the aforementioned object, the present invention comprises the processes of receiving transmission data on the transmission line after having transmitted the transmission data on the transmission line, detecting transmission timing in unit of bit in the received transmission data and based on the timing, determining pulse width per one bit and next bit transmission timing of transmission data to be transmitted to the transmission line.

Further, it is a second object of the invention to define the pulse width per one bit and one bit time of the transmission data correctly to a desired value without being influenced by the transmission delay of the D/R or the receiving delay time of transmission data due to floating capacity of the transmission line.

In order to achieve this object, the present invention comprises the process of defining time responsive to the aforementioned transmission data as time from which the delay time until the transmission data transmitted to the transmission line is received is subtracted.

Further, it is a third object of the invention not to generate an error in the aforementioned time measuring timing due to noise superimposed on the transmission data flowing on the transmission line.

In order to achieve this object, the starting timing of the aforementioned time measurement is allowed to set only in a predetermined time-domain before and after one bit time of the transmission data.

DETAILED DESCRIPTION OF PREFERRED EMBODIMENT

Figure 1:
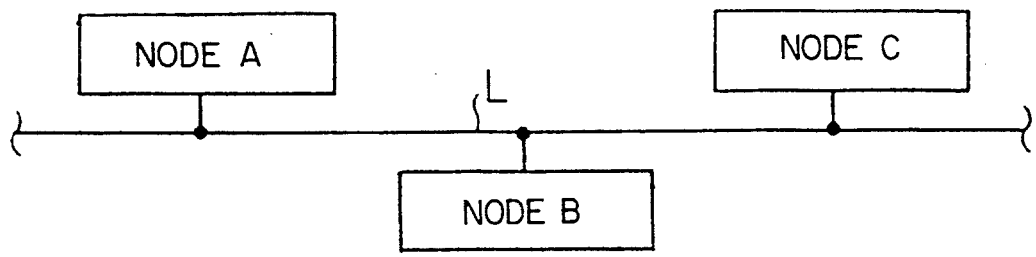
FIG. 1 is a diagram illustrating a construction of a data communication system in outline.
Figure 2:
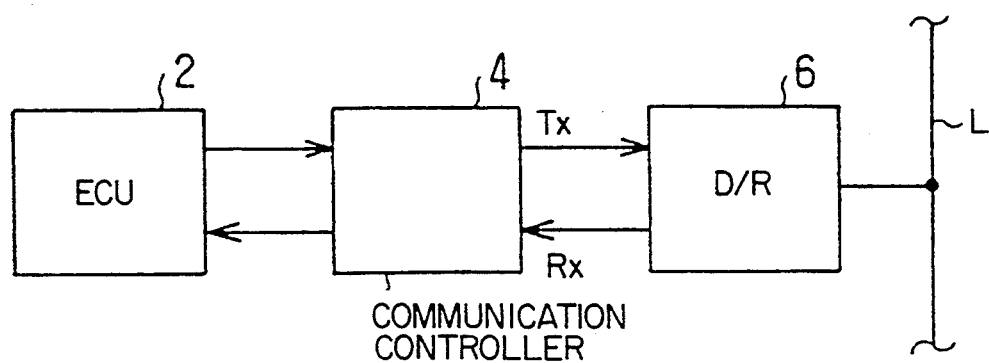
FIG. 2 is a block diagram illustrating a construction of one communication unit.

In a communication system for a vehicle, various nodes such as a master node, a column node for transmitting information on switches (head lamp switch and the like) around a column and a meter node for transmitting information on a warning lamp on a meter panel are connected by a transmission line L. For example, as shown in FIG. 1, nodes A, B, C, . . . are connected through the intermediary of a transmission line L. Each node A, B, C, . . . comprises, as shown in FIG. 2, an electronic control-unit 2 (hereinafter referred to simply as ECU 2) for monitoring and controlling the status of each part of the vehicle, a communication controller 4 for carrying out data communications with other nodes through the intermediary of the transmission line L, D/R 6 (transmission line driver/receiver) inserted between the communication controller 4 and the transmission line L for providing transmission data outputted from a transmission terminal Tx of the communication controller 4 on the transmission line L and for inputting the transmission data received from the transmission line L to a receiving terminal Rx of the communication controller 4.

Figure 3:
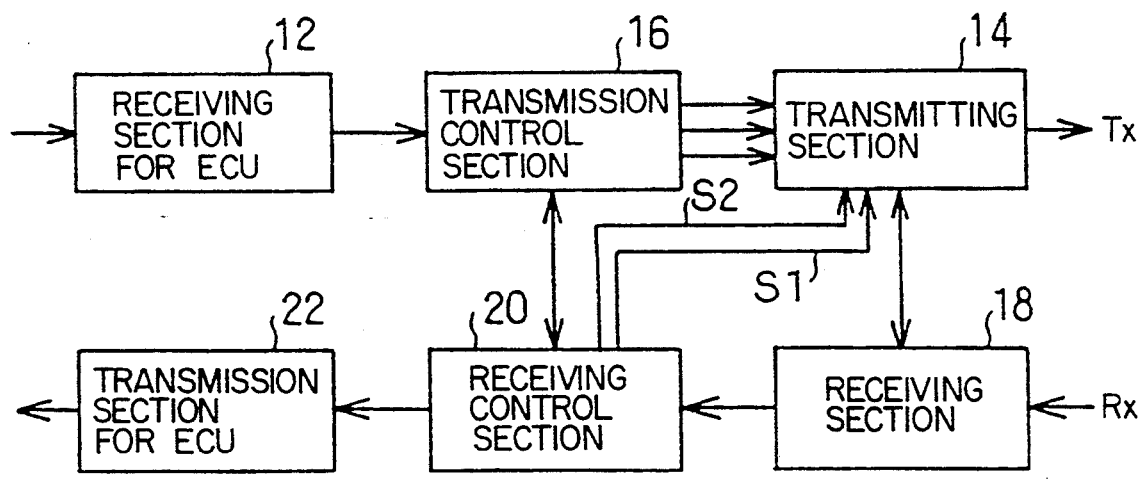
FIG. 3 is a block diagram illustrating a construction of the communication controller of FIG. 2.
Figure 4:
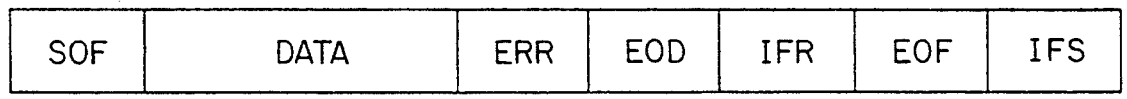
FIG. 4 is a diagram illustrating a frame structure of transmission data.

The communication controller 4 is also structured as shown in FIG. 3. A receiving section for ECU communication 12 receives a transmission request from the ECU 2 and digital data to be transmitted. Here, as shown in FIG. 4, the digital data sent out of the ECU 2 is composed of, conforming to J1850 Standard, frames of Start of Frame code (SOF), data (DATA), error check code (ERR), End of Data code (EOD), Inter Frame Response code (IFR), End of Frame code (EOF) and Inter Frame Separation code (IFS). A transmission control section 16 causes a transmission line transmitting section 14 to transmit transmission data through the D/R 6 based on data transmitted from the receiving section for ECU communication 12. Further, a transmission line receiving section 18 takes in the transmission data on the transmission line L inputted to the receiving terminal Rx through the intermediary of the D/R 6. A receiving control section 20 converts the transmission data taken in by the transmission line receiving section 18 into digital data and takes out various codes from the transmission data to transmit transmission data for answering to the transmission control section 16 as necessary. A transmission section for ECU communication 22 transmits the digital data obtained by the receiving control section 20 to the ECU 2.

Here, when the transmission control section 16 causes the transmission line transmitting section 14 to transmit transmission data, it confirms (carrier check) whether transmission data from another node is flowing on the transmission line L by the signal from the receiving control section 20. If no transmission data from another node is flowing, the transmission control section 16 causes the transmission data from the transmission line transmitting section 14 to be transmitted and if transmission data from another node is flowing, it postpones the transmission of the transmission data for a certain period by being provided with a function as a transmission authorizing means.

The transmission control section 16 is constructed (1) to produce a start signal of SOF contained in transmission data when it receives transmitted data from the receiving section 12 and receives from the receiving control section 20 a signal indicative of no transmission data on the transmission line L, (2) to produce a reference value C indicative of a pulse width of each bit of transmission data successively and (3) to produce a halting signal when it decides to halt the transmission of the transmission data.

The receiving control section 20 compares the transmission data being transmitted and transmission data which is received by the transmission line receiving section 18 per one bit during when the transmission control section 16 is causing the transmission line transmitting section 14 to transmit the transmission data, and if the transmission data do not agree, the receiving control section 20 causes the transmission control section 16 to halt the transmission of the transmission data by being provided with a function as transmission halting means.

Figure 5:
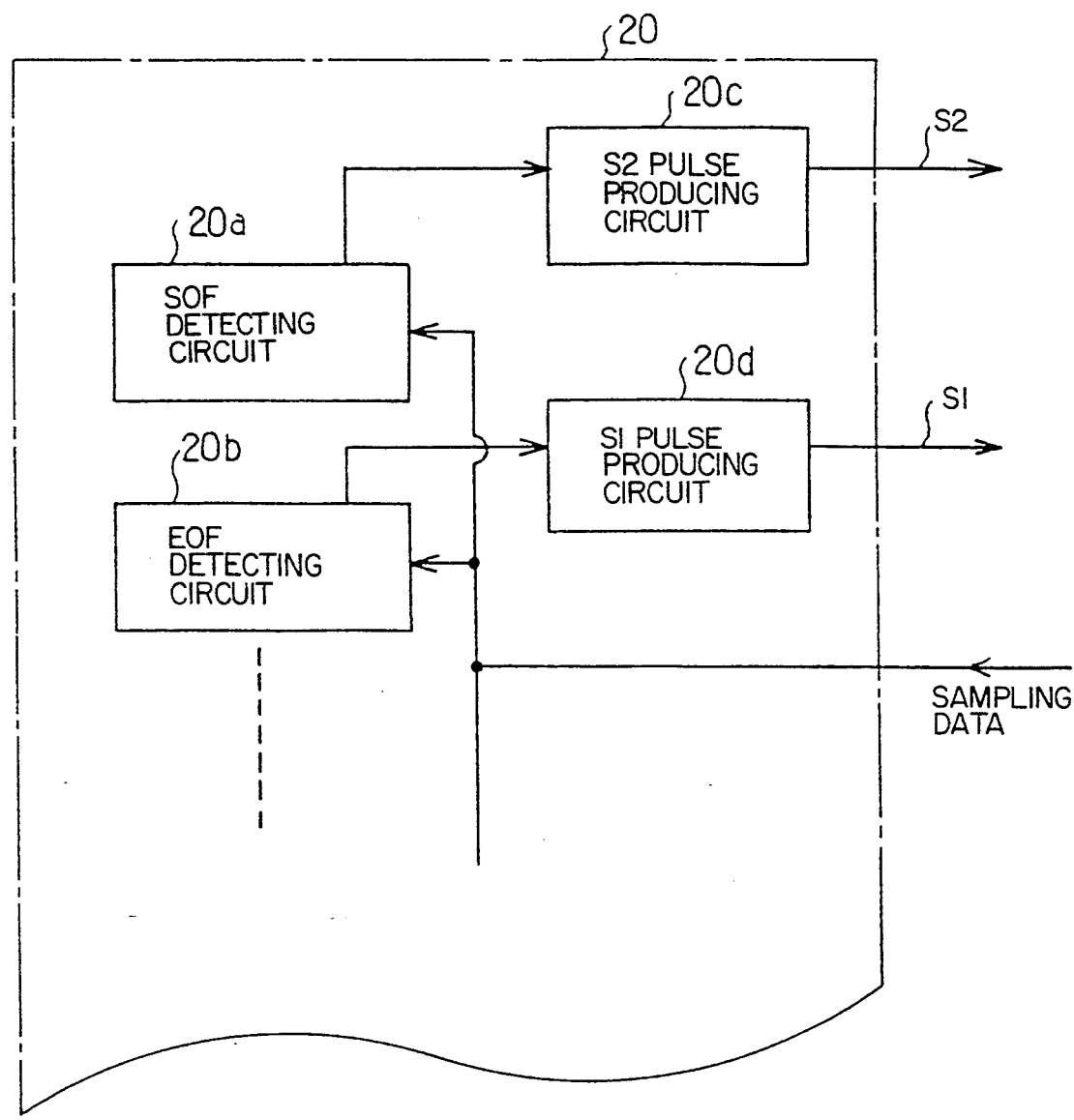
Fig. 5 is a partial block diagram illustrating a receiving control section.

FIG. 5 shows a partial diagram of the receiving control section 20. The aforementioned frame data are detected by detecting circuits 20a, 20b. . . . on the basis of the sampling data of the received transmission data.

Then, the transmission data being transmitted are compared with the received transmission data by a comparing circuit not shown in the drawing. On the other hand, an S2 pulse producing circuit produces an S2 pulse signal when an SOF detecting circuit 20a detects an SOF and an S1 pulse producing circuit produces an S1 pulse signal when an EOF detecting circuit 20b detects an EOF. The meanings of the S1 and S2 pulse signals will be explained later.

Next, the transmission line transmitting section 14 and the transmission line receiving section 18 which are characteristic parts of the present invention will be explained.

Figure 6:
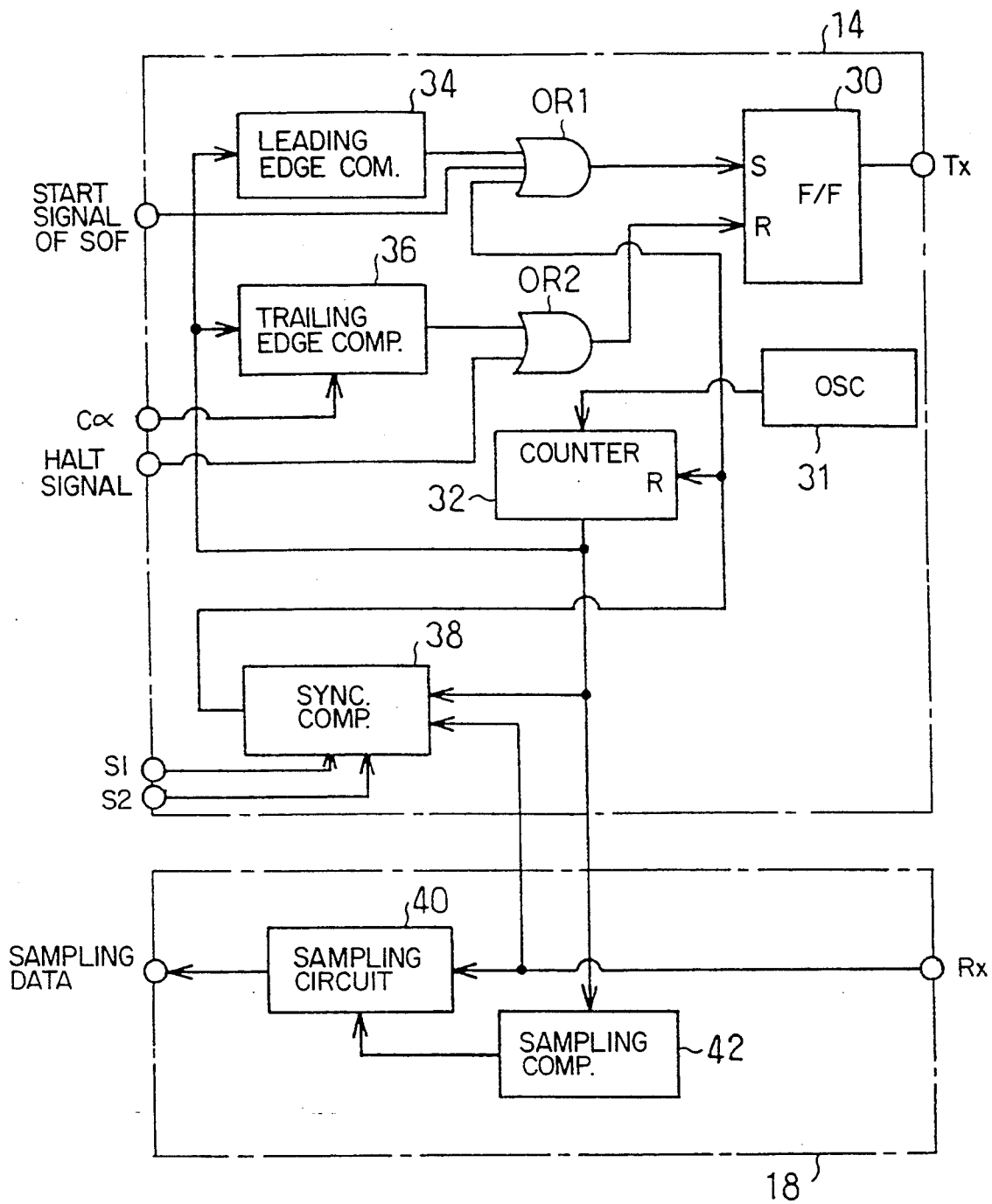
FIG. 6 is a block diagram illustrating a circuit structure of a transmission line transmitting section and a transmission line receiving section in FIG. 3.

As shown in FIG. 6, the transmission line transmitting section 14 comprises a flip-flop 30 (hereinafter referred to simply as F/F) of set/reset type for outputting transmission data through the intermediary of the transmission terminal Tx, a counter 32 for counting by a system clock from an oscillator circuit 31 for counting transmission time of the transmission data per one bit, a leading edge comparator 34 for leading the transmission data outputted by the F/F 30 by setting the F/F 30 through the intermediary of an OR circuit OR 1 when the count value C of the counter 32 reaches to a reference value $C\beta$, a trailing edge comparator 36 for trailing the transmission data outputted by the F/F 30 by resetting the F/F 30 through the intermediary of an OR circuit OR 2 when the count value C of the counter 32 reaches to a reference value $C\alpha$, a synchronization comparator 38 for resetting the counter 32 by the leading edge of the transmission data on the transmission line L inputted to the receiving terminal Rx and for setting the F/F 30 through the intermediary of the OR circuit OR1 when the count value C of the counter 32 is within a predetermined range of more than a certain value Ca ($Ca < C\beta$) and less than a certain value Cb ($Cb > C\beta$). By the way, in starting transmission of the transmission data, a start signal of SOF is sent out from the transmission control section 16, which causes the F/F 30 to be set through the intermediary of the OR circuit OR 1 and the first transmission data to be sent out on the transmission line L.

The transmission line receiving section 18 comprises a sampling circuit 40 comprising a D type flip-flop for sampling transmission data on the transmission line L inputted to the receiving terminal Rx and a sampling comparator for determining sampling timing of the sampling circuit 40 on the basis of the count value C of the counter 32 provided in the transmission line transmitting section 14.

In the transmission line transmitting section 14, the reference value $C\alpha$ of the trailing edge comparator 36 is adapted to be set per one bit of digital data by the transmission control section 16 and the F/F 30 is adapted to be reset directly from the transmission control section 16 through the intermediary of the OR circuit OR2 in order to halt the transmission of the transmission data.

Figure 7:
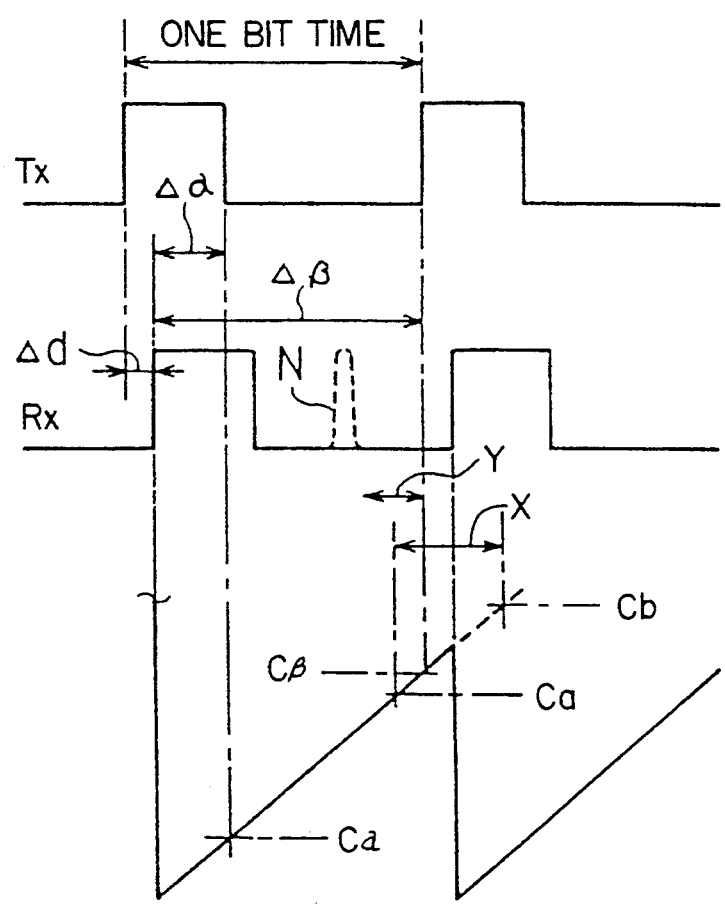
FIG. 7 is a diagram explaining operations for transmitting transmission data by means of the communication controller.

The leading edge comparator 34 for determining leading edge of the transmission data by the count value C of the counter 32 is adapted to lead the transmission data to be transmitted at time point when time $\Delta\beta$ which is what receiving delay time $\Delta d$ of the transmission data is subtracted from one bit time of the transmission data has elapsed since the counter 32 has been reset as shown in FIG. 7 in order to transmit the transmission data correctly.

That is, the value $C\beta$ (93 for example) which is what a value which the receiving delay time $\Delta d$ of the transmission data is reduced to a value (3 for example) of the count value C of the counter 32 is subtracted from a value which one bit time is reduced to a value of the count value C of the counter 32 is defined beforehand for the leading edge comparator 34.

On the other hand, according to the J1850 Standard, it is defined that if a bit of information of digital data is "0", pulse width (i.e. High level time) should be ⅔ for one bit time and if a bit of information of digital data is "1", the pulse width should be ⅓ for one bit time, so that the transmission control section 16 for setting the reference value $C\alpha$ of the trailing edge comparator 36 sets the reference value $C\alpha$ of the trailing edge comparator 36 so that the transmission data trails when time $\Delta\alpha$ which is what the receiving delay time $\Delta d$ of the transmission data is subtracted from the time responsive to a bit of information of digital data (i.e. ⅔ or ⅓ of one bit time) has elapsed since the counter 32 was reset as shown in FIG. 7 in order to let the pulse width of the transmission data to correctly match with the one bit time.

That is, the value $C\alpha$ (61, 29 for example) which is what the value which the receiving delay time $\Delta d$ of the transmission data is reduced to the count value C (3 for example) is subtracted from the value which the pulse width that corresponds to bit information is reduced to the count value C of the counter 32 is defined for the trailing edge comparator 36.

Although the synchronization comparator 38 causes the counter 32 to be set by the leading edge of the transmission data on the transmission line L inputted to the receiving terminal Rx and sets the F/F 30, it limits a domain thereof to domain X wherein the count value C of the counter 32 exists within predetermined range Ca–Cb as shown in FIG. 7. This is because noises from an engine and other sources are superimposed on to the transmission line L, thereby causing pulsating noise N as shown by the dotted line in the transmission data inputted to the receiving terminal Rx and erroneously resetting the counter 32 by the lead of the noise N. That is, the synchronization comparator 38 prevents erroneous operation due to such noise by limiting the reset domain of the counter 32.

The synchronization comparator 38 not only resets the counter 32 by the leading edge of the transmission data on the transmission line L, but also sets the F/F 30. This has two meanings as shown below. Firstly, since the counter 32 is reset when the leading edge of the transmission data on the transmission line L is inputted before transmission data is led, leading of the transmission data by the leading edge comparator 34 becomes impossible; so-called bit missing is prevented from occurring. Such a difference in leading timing of the transmission data may be caused by a difference of system clocks among various communication. Secondly, it is carried out by the reason that when transmission data has been sent out from another communication unit and transmission data is to be transmitted after receiving the former transmission data, synchronous timing cannot be taken by receiving the later transmission data. Due to that, when transmission data has been received, the F/F 30 is set beforehand to transmit to be able to assuredly take synchronization with the later transmission data even when the transmission data is transmitted afterward.

Figure 8:
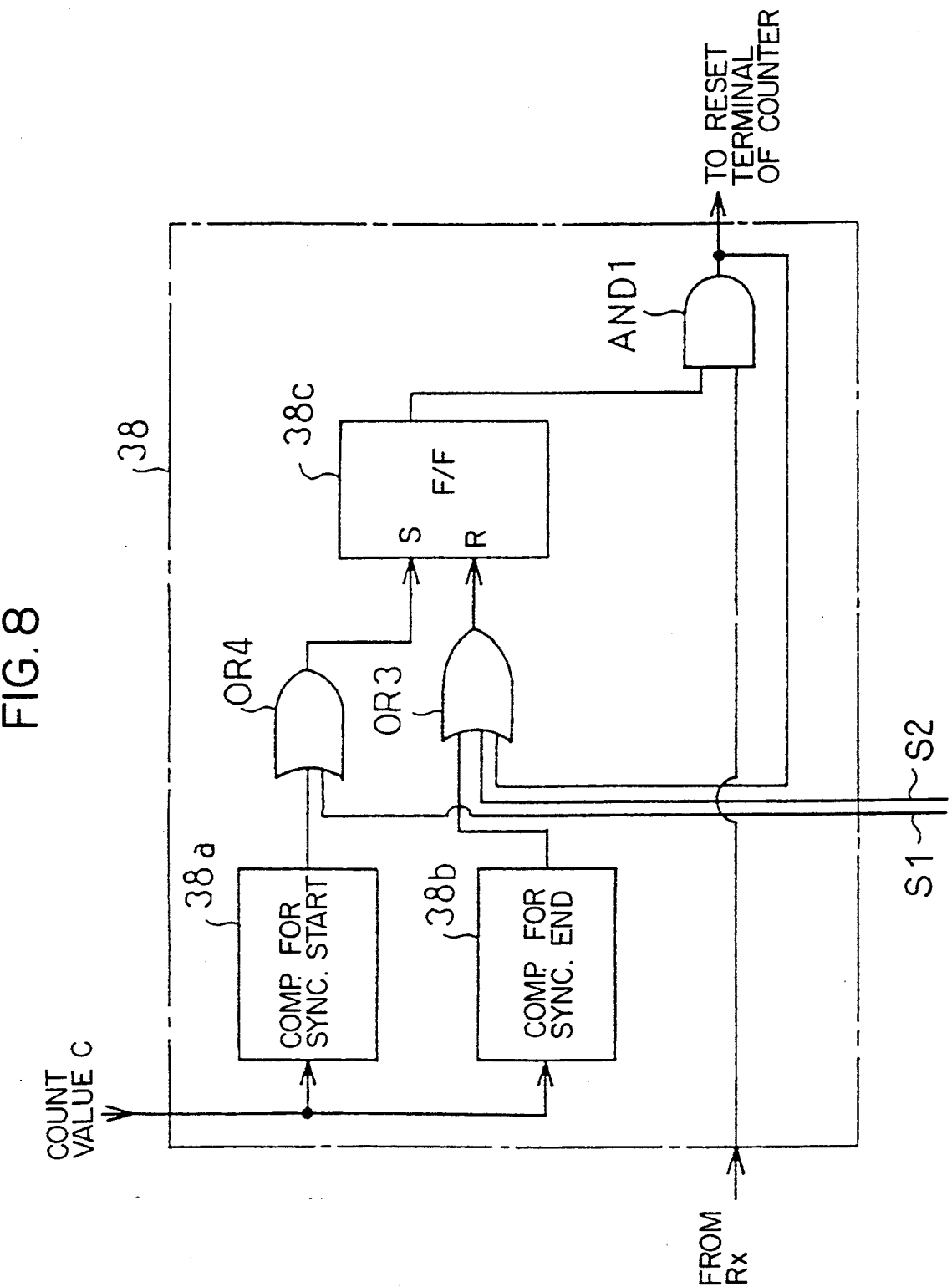
FIG. 8 is a block diagram showing a detail of a synchronization comparator provided in the transmission line transmission section.

As shown in FIG. 8, such a synchronization comparator 38 comprises a synchronization authorization start detecting comparator 38a for generating a signal when the count value C of the counter 32 reaches a predetermined value Ca, a synchronization authorization end detecting comparator 38b for generating a signal when the count value C of the counter 32 reaches to a predetermined value Cb, a F/F 38c which is set by the signal from the synchronization authorization start detecting comparator 38a and is reset by the signal from the synchronization authorization end detecting comparator 38b, an AND circuit AND1 which receives the output of the F/F 38c and transmission data on the transmission line L inputted to the receiving terminal Rx and outputs a High level signal when each signal level is at the High level, and an OR circuit OR3 for inputting the signal from the AND circuit AND1 and the signal from the synchronization authorization end detecting comparator 38b to a reset terminal of the F/F 38c.

That is, in the synchronization comparator 38 of the present embodiment structured as described above, the synchronization authorization start detecting comparator 38c and the synchronization authorization end detecting comparator 38b operate so that the F/F 38c is set when the count value C of the counter 32 is within the predetermined range Ca–Cb and if the transmission data on the transmission line L inputted through the receiving terminal RX during when the F/F 38c is set by such operation goes to a High level, a High level signal is outputted from the AND circuit AND1 and the F/F 38c is reset by the signal.

Therefore, pulse signal for resetting the counter 32 is outputted from the synchronization comparator 38 during the operation period when the transmission data on the transmission line L goes to a High level when the count value C of the counter 32 is within the predetermined range Ca–Cb and then the F/F 38c is reset by the High level signal.

On the other hand, the S1 pulse signal is inputted to a set terminal of the F/F 38c through the OR circuit OR4 and the S2 pulse signal is inputted to a reset terminal of the F/F 38c through the OR circuit OR 3. Therefore, since the F/F 38c is set from EOF of the previous transmission data to SOF of the previous transmission data to SOF of transmission data received this time, the pulse for resetting the counter 32 is sent out when transmission data from another communication unit is received on the transmission line L during this period and as described above, the synchronized transmission data may be transmitted even when the transmission data is transmitted behind another communication unit.

In the data communication system described above, the communication controller 4 provided in each of the nodes A, B and C starts transmission of transmission data when no transmission data from other nodes is flowing on the transmission line L and halts the transmission when the transmission data flowing on the transmission line L does not agree with the transmission data which it transmitted during the transmission. Also each communication controller 4 starts the transmission of the transmission data when the F/F 30 of the transmission line transmitting section 14 is set by the transmission control section 16 and thereafter, generates transmission data basically by implementing pulse-width modulation on digital data per one bit by the pulse width and one bit time determined respectively by the count value C of the counter 32 reset by the leading edge of the transmission data flowing on the transmission line L and the reference values C and Cβ.

Figure 9:
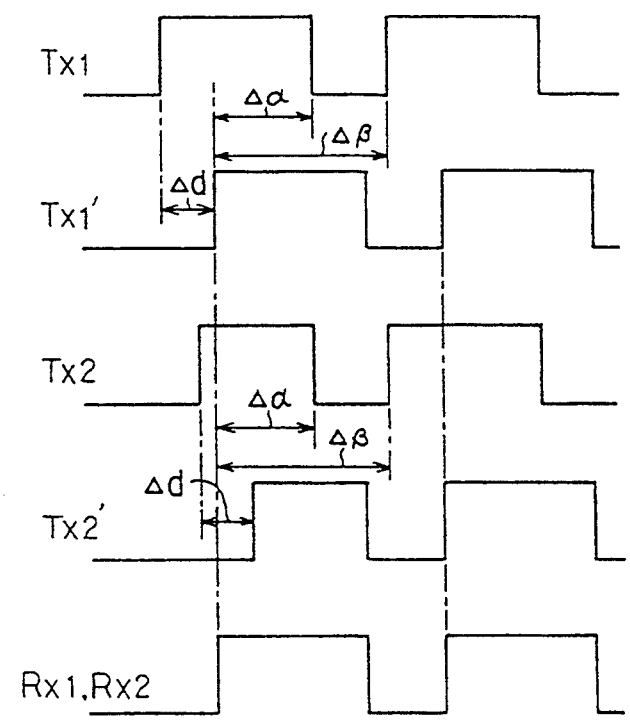
FIG. 9 is a chart for explaining operations of the data communication system when transmission timings among each node are deviating;.

Due to that fact, when two communication units start transmission of transmission data with different timings from their transmission terminals TX1 and TX2 due to the receiving delay d of the transmission data caused by the transmission delay of the D/R 6 or the floating capacity of the transmission line as shown in FIG. 9, the communication unit which started the transmission late synchronizes its transmission data with the transmission data from the communication unit which started the transmission earlier.

Figure 10:
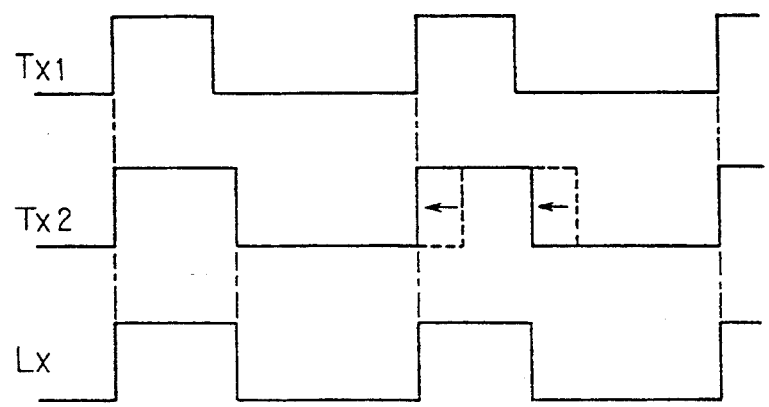
FIG. 10 is a chart for explaining operations of the data communication system when system clocks among each node are deviating.

Further, when two communication units have started transmission of transmission data having different periods due to the difference of system clocks between the communication units from their transmission terminals TX1 and TX2 as shown in FIG. 10, the communication unit which transmits transmission data with a longer period synchronizes its transmission data with transmission data from the communication unit transmitting its transmission data having a shorter period. In this case, although the pulse width itself may differ due to the difference of the system clocks, no hindrance will be caused in judging whether the transmission data one unit transmitted agrees with transmission data flowing on the transmission line L provided that the difference is within the allowable range. That is, the judgment of the agreement of the data is carried out in a way of sampling such as three point check, not judging the agreement one by one.

Accordingly, as it is apparent from the above description, the present embodiment allows transmission data transmitted by each of the communication controllers 4 to be synchronized with transmission data flowing on the transmission line L per one bit of the transmission data.

Further, according to the present embodiment, since the count values Cβ and Cα corresponding to values which the transmission delay time Δd is subtracted from pulse width that corresponds with one bit time and bit information are defined as reference values for the leading edge comparator 34 for determining leading edge of transmission data and for the trailing edge comparator 36 for determining trailing edge of the transmission data, the transmission data transmitted by each of the communication controllers 4 will not be prolonged by the transmission delay time Δd by synchronizing the transmission data with the transmission data on the transmission line L and each of the communication controllers 4 can set the one bit time and pulse width of the transmission data correctly.

Furthermore, according to the present embodiment, the synchronization comparator 38 limits the domain wherein the counter 32 is reset by the leading edge of the transmission data on the transmission line L per one bit of the transmission data, so that the counter is prevented from erroneously being reset by noise and the like superimposed on the transmission data flowing on the transmission line L.

Although transmission data to be transmitted is synchronized with transmission data on the transmission line L by resetting the counter 32 by leading edge of the transmission data flowing on the transmission line L inputted to the receiving terminal Rx in the aforementioned embodiment, the counter 32 may be reset by trailing edge of the transmission data flowing on a transmission line in a case of data communication system having a transmission line through which transmission data having positive and negative signs different from the transmission data in the aforementioned embodiment flows such as a twisted pair data communication system which is structured so that two transmission data inverted from each other are transmitted by two transmission lines.

Figure 11:
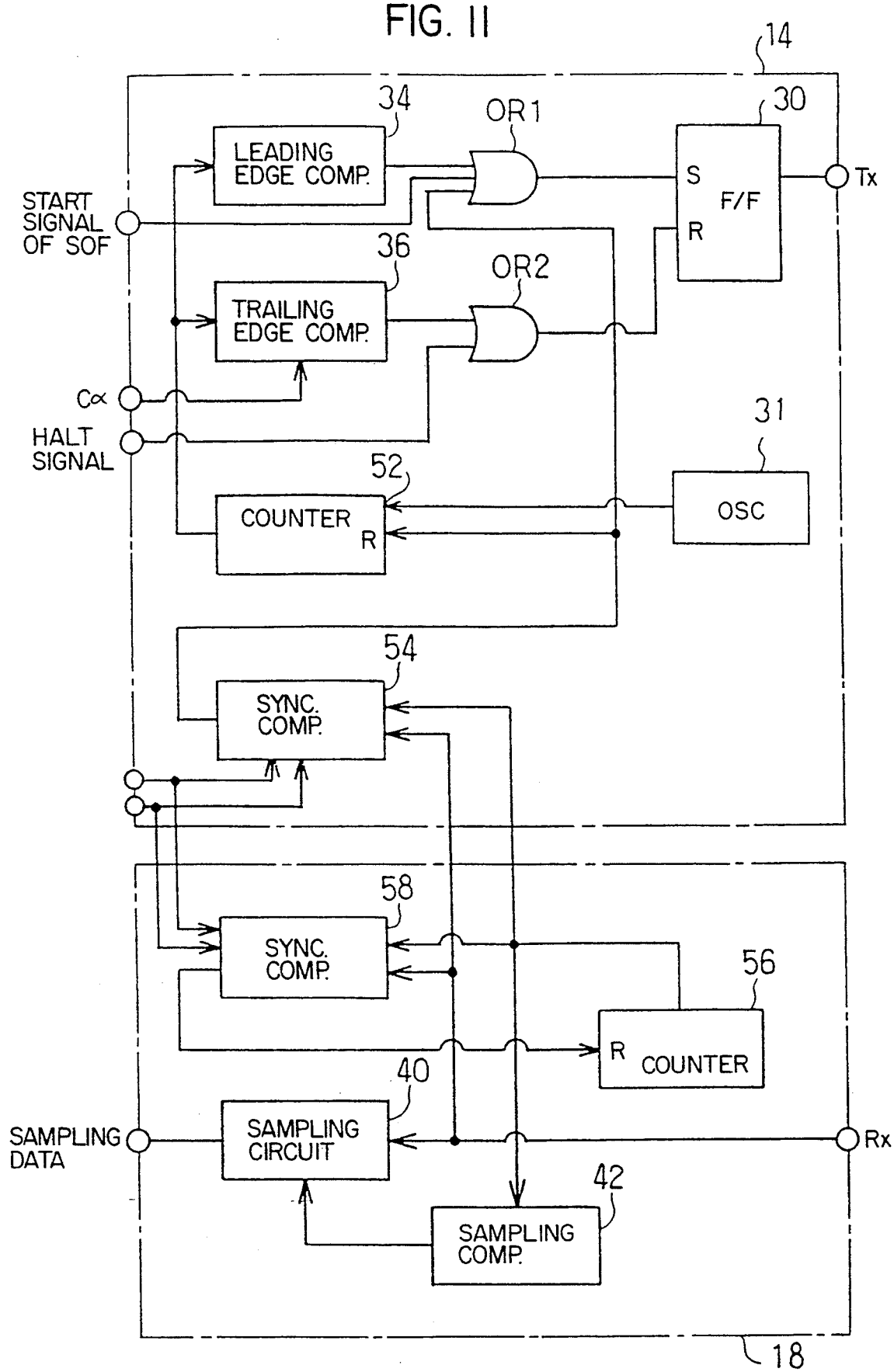
FIG. 11 is a block diagram showing another circuit structure of the transmission line transmission section and the transmission line receiving section.
Figure 12:
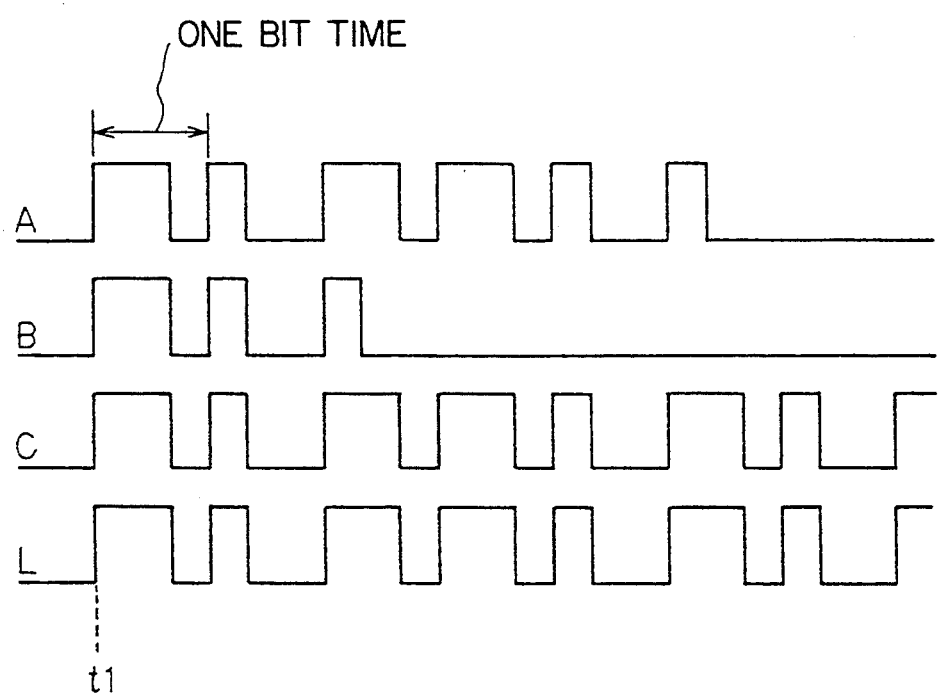
FIG. 12 is a chart explaining communication operations of a communication unit composing a prior art data communication system.
Figure 13:
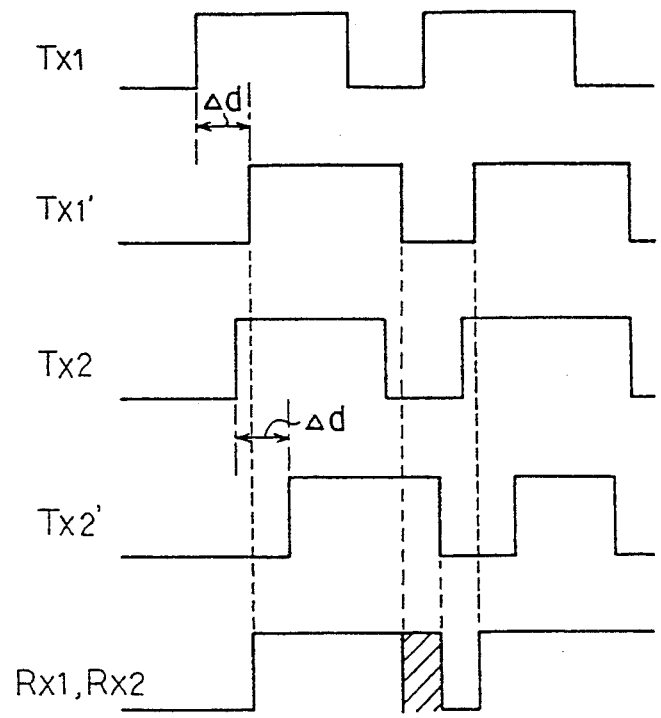
FIG. 13 is a chart for explaining a problem of a prior art communication unit.
Figure 14:
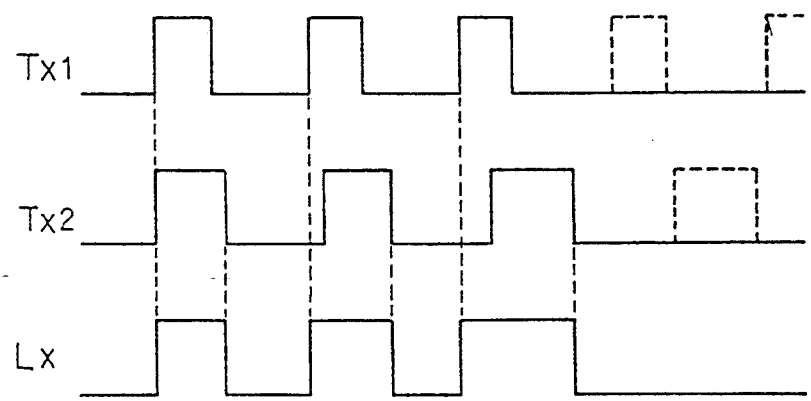
FIG. 14 is a chart for explaining another problem of the prior art communication unit.

Further, although the aforementioned embodiment has been structured so that the counter 32 for determining leading edge and trailing edge of transmission data and the synchronization comparator 38 for resetting the counter 32 by leading timing of the transmission data on the transmission line L are provided respectively in the transmission line transmitting section 14 and the sampling comparator 42 in the transmission line receiving section 18 determines sampling timing of the sampling circuit 40 from the count value of the counter 32, the transmission data may be synchronized with the transmission data on the transmission line L per one bit even when, as shown in FIG. 11, a transmission counter 52 and a transmission synchronization comparator 54 are provided in the transmission line transmitting section 14 and a receiving counter 52 and a receiving synchronization comparator 58 are provided in the transmission line receiving section 18 respectively and count value of the transmission counter 52 is used when the leading and trailing timing of the transmission data is determined in the transmission line transmitting section 14 and count value of the receiving counter 56 is used when the sampling timing of the sampling circuit 40 is determined in the transmission line receiving section 18.

What is claimed is:

1. A communication unit for use in a communication system adapted for transmitting and receiving data comprising a plurality of bits among a plurality of communication units, said communication unit comprising:

transmitting means for transmitting information to a transmission line as first transmission data;

transmission authorizing means for authorizing transmission of said first transmission data from said transmitting means to said transmission line when no transmission data from another communication unit is flowing on said transmission line;

transmission halting means, operatively connected to said transmitting means, for comparing said first transmission data with second transmission data which is received from said transmission line on a bit-by-bit basis, and for halting transmission of said first transmission data from said transmitting means to said transmission line when it is determined that said first transmission data and said second transmission data do not agree;

counting means for counting a transmission time of said first transmission data on a bit-by-bit basis;

reset means for resetting said counting means by receiving said first transmission data on said transmission line and by detecting a start timing of each bit in said first transmission data; and transmission data generating means having a comparing means for generating said first transmission data in the form of a pulse signal for each bit, a pulse width of each pulse signal representing a bit to be transmitted and transmission timing of a next bit of said first transmission data to be transmitted by said transmitting means to said transmission line being determined by comparing a count value of said counting means with a reference value set for each bit according to said information to be transmitted.

2. A communication unit according to claim 1, further comprising:

a transmission line driver/receiver provided between said transmitting means and said transmission line for sending the transmission data from said transmitting means to the transmission line and for receiving the transmission data on the transmission line.

3. A communication unit according to claim 1, further comprising:

means for setting said reference value in accordance with a delay time of a data transmission through said transmission line.

4. A communication unit according to claim 1, further comprising:

means for starting transmission of a next bit from said transmitting means in a predetermined time relation with the reset timing of said counting means.

5. A communication unit according to claim 1, wherein said reset means comprises:

means for resetting said counting means even when said start timing of each bit in received transmission data is detected during a period from when transmission of the transmission data is ended until transmission of next transmission data is started.

6. A communication unit according to claim 1, wherein said transmission data generating means comprises:

pulse width defining means, connected to said counting means and said transmitting means, for defining a pulse width of said pulse signal by changing a signal level transmitted from said transmitting means when said count value of said counting means reaches a reference value which is equivalent to a pulse width of said pulse signal; and bit length defining means, connected to said counting means and said transmitting means, for starting a next bit transmission from said transmitting means when said counter value of said counting means reaches the reference value which is equivalent to one bit of said first transmission data.

7. A communication unit for use in a communication system adapted for transmitting and receiving data comprising a plurality of bits among a plurality of communication units, said communication unit comprising:

transmitting means for sending out information to be transmitted to a transmission line as first transmission data;

transmission authorizing means for authorizing transmission of said first transmission data from said transmitting means to said transmission line when no transmission data from another communication unit is flowing on said transmission line;

transmission halting means, operatively connected to said transmitting means, for comparing said first transmission data with second transmission data which is received from said transmission line on a bit-by-bit basis, and for halting transmission of said first transmission data from said transmitting means to said transmission line when it is determined that said first transmission data and said second transmission data do not agree;

counting means for counting a transmission time of said first transmission data on a bit-by-bit basis;

reset means for resetting said counting means by receiving said first transmission data on said transmission line and by detecting a start timing of each bit in said first transmission data; and transmission data generating means having a comparing means for generating said first transmission data in the form of a pulse signal for each bit, a pulse width of each pulse signal representing a bit to be transmitted and transmission timing of a next bit of said first transmission data to be transmitted by said transmitting means to said transmission line being determined by comparing a count value of said counting means with a reference value set for each bit according to said information to be transmitted;

wherein said reset means includes counter reset limiting means for authorizing reset of said counter only in a predetermined time interval starting and ending before and after the end of one bit time of said first transmission data, respectively.

8. A communication unit according to claim 7, wherein said counter reset limiting means comprises:

start timing defining means for defining start timing of said predetermined time interval;

end timing defining means for defining end timing of said predetermined time interval; and means for resetting said counting means when said start timing of each bit in said first transmission data is detected during a period from when the start timing is detected by said start timing defining means until end timing is detected by said end timing defining means, said resetting means being operatively connected to said start timing defining means and said end timing defining means.

9. A communication unit for use in a communication system for transmitting and receiving transmission data comprising a plurality of bits among a plurality of communication units, said communication unit comprising:

transmitting means for sending out information to be transmitted on a transmission line as first transmission data;

transmission halting means for comparing said first transmission data with second transmission data which is received from said transmission line on a bit-by-bit basis, and for halting transmission of said first transmission data from said transmitting means to said transmission line when it is determined that said first transmission data and said second transmission data do not agree;

timing detecting means for receiving said first transmission data on said transmission line and for detecting a start timing of each bit in said first transmission data; and transmission data generating means for generating said first transmission data in the form of a pulse signal for each bit, a pulse width of a pulse signal representing a bit to be transmitted and transmission timing of a next bit of said first transmission data to be transmitted by said transmitting means to the transmission line being determined on the basis of the timing detected by said timing detecting means.

10. A communication unit according to claim 9, wherein said transmission data generating means comprises:

time measuring means for determining a pulse width of one bit and transmission timing of a next bit of the transmission data to be transmitted by said transmitting means to the transmission line from the timing point detected by said timing detecting means.

11. A communication unit for use in a communication system for transmitting and receiving transmission data comprising a plurality of bits among a plurality of communication units, said communication unit comprising:

transmitting means for sending out information to be transmitted on a transmission line as first transmission data;

transmission halting means for comparing said first transmission data with second transmission data which is received from said transmission line on a bit-by-bit basis, and for halting transmission of said first transmission data from said transmitting means to said transmission line when it is determined that said first transmission data and said second transmission data do not agree;

timing detecting means for receiving said first transmission data on said transmission line and for detecting a start timing of each bit in said first transmission data;

transmission data generating means for generating said first transmission data in the form of a pulse signal for each bit, a pulse width of a pulse signal representing a bit to be transmitted and transmission timing of a next bit of said first transmission data to be transmitted by said transmitting means to the transmission line being determined on the basis of the timing detected by said timing detecting means;

wherein said transmission data generating means comprises time measuring means for determining a pulse width of one bit and transmission timing of a next bit of said first transmission data to be transmitted by said transmitting means to the transmission line from a timing point detected by said timing detecting means; and wherein said time measuring means comprises pulse width defining means for defining said pulse width of one bit by changing a signal transmitted from said transmitting means when a time equivalent to the pulse width of one bit of said first transmission data is reached from the timing point detected by said timing means; and bit length defining means for starting transmission of the next bit from said transmitting means when the time equivalent to one bit time of said first transmission data is reached from the timing point detected by said timing means.

12. A method of communicating data of a plurality of bits among a plurality of communication units connected via a transmission line, said method comprising the steps of:

transmitting transmission data bit by bit on said transmission line, each bit of said transmission data being in the form of a pulse signal having a fixed time length indicative of each bit length and a variable time length indicative of bit information of each bit for said transmission data to be transmitted;

receiving the transmission data on said transmission line;

detecting a start timing of each bit of said received transmission data in response to a change in the signal level of said pulse signal when said change is in a predetermined first direction;

starting measurement of a measured time length in synchronization with each detection of said start timing of each bit;

comparing the measured time length with a first reference value and a second reference value, said first reference value being determined in accordance with said variable time length and a data transmission line delay time and said second reference value being determined in accordance with said fixed time length and said delay time of data transmission on said transmission line;

changing, in a second direction opposite to said first direction, the signal level of said pulse signal to be transmitted on said transmission line when the measured time length attains said first reference value, thereby defining the end of said variable time length indicative of bit information of a bit being transmitted; and changing, in said first direction, the signal level of said pulse signal to be transmitted on said transmission line when the measured time length attains said second reference value, thereby defining the start of said fixed time length of a next bit to be transmitted.

* * * * *